United States Patent [19]

Christianson et al.

[11] Patent Number: 4,495,207

[45] Date of Patent: Jan. 22, 1985

[54] PRODUCTION OF FOOD-GRADE CORN GERM PRODUCT BY SUPERCRITICAL FLUID EXTRACTION

[75] Inventors: Donald D. Christianson, Peoria; John P. Friedrich, Green Valley, both of Ill.

[73] Assignee: The United States of America as represented by the Secretary of Agriculture, Washington, D.C.

[21] Appl. No.: 436,541

[22] Filed: Oct. 25, 1982

[51] Int. Cl.$^3$ .............................................. A23L 1/172
[52] U.S. Cl. .................................. 426/312; 426/622; 426/627; 426/417
[58] Field of Search ............... 426/622, 627, 417, 425, 426/312, 481

[56] References Cited

U.S. PATENT DOCUMENTS

| | | | |
|---|---|---|---|
| 3,939,281 | 2/1976 | Schwengers | 426/11 |
| 4,331,695 | 5/1982 | Zosel | 426/417 |
| 4,427,707 | 1/1984 | Heine et al. | 426/425 |

FOREIGN PATENT DOCUMENTS 1356749  6/1974  United Kingdom .

OTHER PUBLICATIONS

Stahl et al., "Extraction of Seed Oils with Liquid and Supercritical Carbon Dioxide," J. Agric. Food Chem. 28(6): 1153–1157 (1980).
Friedrich et al., "Petroleum-Free Extraction of Oil from Soybeans with Supercritical $CO_2$," JAOCS 59(7): 288–292, (Jul. 1982).
Christianson et al., "Super Critical $CO_2$ Extraction of Oil and Water from Wet Milled Corn Germ and Quality Evaluation of Extracted Flour," Abstract presented at 66th Annual AACC Meeting, Denver, CO (Oct. 25–29, 1981).
Blessin et al., "From a Commercial Dry-Milled Corn Fraction," Cereal Sci. 19(6): 224–225, (Jun. 1974).
Canolty et al., "Relative Protein Value of Defatted Corn Germ Flour," J. Food Sci. 42: 269–270 (1977).

*Primary Examiner*—Raymond Jones
*Assistant Examiner*—Elizabeth C. Weimar
*Attorney, Agent, or Firm*—M. Howard Silverstein; David G. McConnell; Curtis P. Ribando

[57] ABSTRACT

A high-protein, food-grade product is prepared by defatting dry-milled corn germ fractions with carbon dioxide under supercritical conditions. The residual lipid and peroxidase activity responsible for development of off-flavors during storage are reduced to a fraction of the levels obtainable by conventional hexane extraction methods.

16 Claims, No Drawings

PRODUCTION OF FOOD-GRADE CORN GERM PRODUCT BY SUPERCRITICAL FLUID EXTRACTION

BACKGROUND OF THE INVENTION

1. Field of the Invention

Efforts to expand world markets for U.S. farm products have led to the investigation of marketing commodities in a higher-valued, more finished form than is now customary. Defatted corn germ flour, a byproduct of the corn oil industry, is one such commodity having nutritional and economic potential. Traditionally, it has been utilized as an ingredient in animal feeds. The principal problem in developing corn germ as a finished vegetable protein product for human consumption relates to product deterioration during shipment, distribution and other extended periods of storage. Conventional pressing methods and solvent extraction methods using hexane or similar hydrocarbons leave lipids in the flour which either auto- or enzymatically oxidize into compounds which contribute to grassy/beany and bitter flavors. The commercially produced, solvent-extracted, corn germ flour taught by Canolty et al. [J. Food Sci. 42: 269 (1977)], for example, contains a residual oil content of 2%. The result is an eventual reduction in the product's organoleptic and nutritional qualities. Attempts to inactivate the oxidative enzymes by toasting have proven unsatisfactory from the standpoint of effectiveness, economics, and energy consumption. This invention relates to a method of processing corn germ so as to extract the oil and simultaneously produce a high-quality, food-grade flour without toasting.

2. Description of the Prior Art

In the art of vegetable oil extraction, increasing attention has been given to the technology of supercritical fluids as an alternative to current extraction methods. Supercritical fluids (SCF's) are often referred to as dense gases. Technically, an SCF is a gas existing above its critical temperature and critical pressure, as defined in the phase diagram of the pure substance. When a gas is compressed above its critical temperature, densities increase dramatically. Therefore, under a given set of conditions, an SCF may possess the density of a liquid while maintaining the diffusivity of a gas. Of the several SCF's investigated, supercritical carbon dioxide (SC-$CO_2$) is ideal because it is nontoxic, nonexplosive, inexpensive, readily available, and easily removed from the extracted product.

The solvent properties of SCF's have been recognized for over 100 years, but commercial applications have been slow in developing. Decaffeination of coffee with SC-$CO_2$ is the only current large-scale commercial SCF process, though other uses are being investigated. British Pat. No. 1,356,749 teaches the SCF extraction of oils from crushed or coarsely ground seeds including copra, sunflower, coconut, soybeans, and peanuts. Stahl et al. [J. Agric. Food Chem., 28(6): 1153–1157 (1980)] elaborates on the parameters influencing the removal and fractionation of soybean, sunflower seed, and rapeseed oils in terms of yield, color, taste, and odor. As exemplified by these and other teachings in the art, applications of SCF technology have emphasized the oil recovery, with little or no attention being given to the seed residue. An exception is found in the disclosure of Schwengers, U.S. Pat. No. 3,939,281. After SCF extraction of crushed whole cereal grains, Schwengers soaks the defatted residue in aqueous sulfur dioxide and optionally removes fractions of gluten and starch. The remainder of the residue is recovered for use as animal fodder.

SUMMARY OF THE INVENTION

We have now unexpectedly discovered that when a dry-milled corn germ fraction is subjected to lipid extraction by a carbon dioxide solvent under supercritical conditions, not only is the residual lipid content reduced to less than half that obtainable by hexane extraction, but also the peroxidase activity is reduced sevenfold. As a result, flour produced from the $CO_2$-extracted corn germ residue is characterized by an acceptable flavor and extended shelf life.

In accordance with this discovery, it is an object of the invention to provide a process of producing a high-quality, food-grade corn germ product suitable for human consumption.

More particularly, it is an object of the invention that the aforementioned process be compatible with a concurrent method for extracting and recovering oil from dry-milled corn germ.

It is also an object of the invention that the extractant be economically feasible and environmentally safe.

It is a further object of the invention to produce an untoasted corn germ flour which has an acceptable flavor profile even after prolonged periods of storage.

Other objects and advantages of the invention will become readily apparent from the ensuing description.

DETAILED DESCRIPTION OF THE INVENTION

The starting material contemplated for use in the invention includes any corn germ fraction obtained from a conventional dry milling process which typically comprises approximately 50% by weight of germ material. The moisture content of the material should be limited to less than about 9% by weight, beyond which it tends to interfere with the lipid extractability. For purposes of enhancing the extraction efficiency, it is preferred to first flake the particulate mill fraction, or to otherwise treat it by methods known in the art for making the oil more physically available. Flaking is most readily accomplished at moisture contents of about 6–8%.

Any conventional SCF equipment comprising an extractor and separator would be suitable for carrying out the inventive method. After packing the corn germ material into the extractor, the SC-$CO_2$ is injected at the predetermined combination of temperature and pressure. With respect to the quality of the final product, the actual conditions of treatment are discretionary provided that the $CO_2$ fluid is in the supercritical state. Temperatures may range from about 40°–80° C. and pressures should exceed about 135 bar (2000 p.s.i.g.). The solubility of the oil in the $CO_2$ is a function of the temperature and pressure, and under fixed conditions it remains virtually constant throughout most of the extraction. However, as the residual oil in the germ material approaches zero, so does the solubility.

Oil-laden SC-$CO_2$ is passed from the extractor to the separator for subsequent recovery. The defatted residue (corn germ meal) recovered from the extractor is dry and very friable. It is readily milled to a fine, highly dispersible flour having utility in beverages, doughs, baked products, and batter foods. The flour will generally contain 20–25% by weight protein.

By virtue of this method, the triglyceride oil in the germ material can be reduced to a level of less than 1% and the "bound" lipids to a level of about 2% by weight. The "bound" lipids are azeotrope-extractable substances of unknown structure. When isolated, they are characterized by a bitter flavor and phenolic odor, and are therefore probably responsible for the bitter flavors in hexane-extracted germ. Also, in the SC-$CO_2$ treated germ, the grassy/beany off-flavors characteristic of the hexane-processed material are present at low intensity, both initially and after periods of storage. This is attributed to denaturization of the oxidative enzyme associated with peroxidase activity, resulting in a residual activity of less than 1 unit/min./g. of germ. Upon prolonged periods of storage, the overall organoleptic properties of the SC-$CO_2$ extracted germ show little deterioration and remain at least as acceptable as freshly extracted residue obtained by the hexane process.

The following example is intended only to further illustrate the invention and is not intended to limit the scope of the invention which is defined by the claims.

periodic intervals permitted calculation of oil recovery rates and oil solubility. These values remained constant until the residual oil was reduced to a few percent of the initial level. The oil solubility in the $CO_2$ under these conditions was 2.7%. When the extraction rate began to drop, the $CO_2$ flow rate was decreased by 7-10 L/min., and the extraction was continued until less than 1 g. of oil/hr. was obtained. The defatted germ residue was removed from the extractor and pin-milled at 9000 r.p.m. to yield a flour having a mean particle size of less than 75 microns (200 mesh). Recovered flours having a final moisture content of 2.0-3.5% were analyzed by standard methods. The results representing the averages of the replicate runs are compared to hexane-extracted corn germ (Samples C and D) in Tables I-III, below.

It is understood that the foregoing detailed description is given merely by way of illustration and that modification and variations may be made therein without departing from the spirit and scope of the invention.

TABLE I

| Sample | Germ moisture content (% by wt.) | Extracting solvent | Residual lipid Triglyceride[a] (% by wt.) | Bound[b] lipid (% by wt.) | Protein[c] (% by wt.) | Ash[d] (% by wt.) | Peroxidase[e] activity | NSI[f] |
|---|---|---|---|---|---|---|---|---|
| A | 3.5 | SC—$CO_2$ | 0.7 | 2.0 | 20.7 | 8.9 | 0.97 | 30 |
| B | 8 | SC—$CO_2$ | 0.9 | 2.3 | 21.0 | 10.5 | 0.94 | 24 |
| C | 3.5 | hexane[g] | 2.0 | 8.7 | 20.9 | 11.2 | 7.28 | 58 |
| D | 3.5 | hexane[h] | 0.5 | 4.7 | 23.8 | 13.8 | 6.75 | 51 |

[a]Residual triglyceride [Black et al., Cereal Chem. 44: 152 (1967)].
[b]Soxhlet extraction, 20-hr. hexane-ethanol Azetrope (82:18) [Eldridge et al., Cereal Chem. 48: 640 (1971)].
[c]Kjeldahl, N × 5.4 [AACC Method, 1962].
[d]Ash [AACC Method, 1962].
[e]Units/min./g. germ [Gardner et al., J. Food Sci. 36: 645 (1971)].
[f]Nitrogen solubility index [AOAC Method, 1966].
[g]Soxhlet extracted, 5 hr. [AOAC Method, 1966].
[h]Upper cut fraction obtained by liquid classification [Kron, Cereal Chem. 58: 334 (1981)]. Sample was toasted, dry heat, 200° F., 20 min.

EXAMPLE

A pair of replicate 1000-g. samples of full-fat dry-milled corn germ containing 23.4% oil, 14.4% protein, 6.8% ash, and 3.5% moisture stored at 37° F. before use was passed through a smooth roller mill to produce 0.4-5.0 mm. thick flakes, and was designated as Sample A. A second pair of replicate 1000-g. samples of the corn germ was tempered by hydrating to 8% moisture content prior to flaking and was designated as Sample B. The four samples were thereafter identically extracted in a series of four runs in the SC-$CO_2$ equipment described in detail in Friedrich et al. [JAOCS, 59(7): 288-292 (July 1982)], herein incorporated by reference.

The sample was loaded into the 2-L extractor, which was thereafter sealed and brought to 550 bar (8000 p.s.i.g.) pressure while it was being heated to a controlled 50° C. With a $CO_2$ cylinder pressure of 76-83 bar (1100-1200 p.s.i.g.), a flow of 15-18 standard L/min. was maintained. The separator (receiver) was heated to 60° C. to remove extracted water from the recovered oil. Measurement of $CO_2$ consumed and oil recovered at

TABLE II

| Amino acid | Dry-milled germ flour[a]; g. amino acid/100 g. protein | |
|---|---|---|
| | Sample A (SC—$CO_2$ extracted) | Sample C (hexane extracted) |
| essential amino acids | | |
| histidine | 3.1 | 3.4 |
| isoleucine | 3.7 | 3.2 |
| leucine | 8.4 | 6.5 |
| lysine | 5.6 | 5.3 |
| methionine | 1.6 | 1.9 |
| cystine | 1.4 | 1.7 |
| total sulfur-amino acids | 3.0 | 3.6 |
| phenylalanine | 4.6 | 4.0 |
| tyrosine | 3.7 | 3.1 |
| total aromatic amino acids | 8.3 | 7.1 |
| threonine | 4.2 | 3.8 |
| valine | 6.1 | 5.5 |

[a]Extracted samples were hydrolyzed in 6N HCl under reflux conditions for 24 hr. followed by chromatographic separation of amino acids and analysis on a "Glenco 1000" amino acid analyzer.

TABLE III

| Flavor evaluation[1] | Initial | | | 5-Wk. at 100° F. | | 2-Mo. at 77° F. | |
|---|---|---|---|---|---|---|---|
| | Sample C | Sample A | Sample B | Sample A | Sample B | Sample A | Sample B |
| overall score[2] | 5.2[b] | 5.8[b] | 6.9[a] | 5.8[b] | 5.7[b] | 6.0[b] | 6.1[b] |
| intensity values[3] | | | | | | | |
| cereal/grain | 0.5 | 1.1 | 0.9 | 1.3 | 1.0 | 1.3 | 1.1 |
| grassy/beany | 1.1 | 0.2 | 0.5 | 0.5 | 0.4 | 0.2 | 0.3 |
| bitter | 1.3 | 0.7 | 0.5 | 0.6 | 0.8 | 0.8 | 1.0 |

TABLE III-continued

| Flavor evaluation[1] | Initial | | | 5-Wk. at 100° F. | | 2-Mo. at 77° F. | |
|---|---|---|---|---|---|---|---|
| | Sample C | Sample A | Sample B | Sample A | Sample B | Sample A | Sample B |
| astringent | 0.5 | 0.3 | 0.4 | 0.3 | 0.3 | 0.5 | 0.3 |
| toasted | — | 0.9 | — | 1.0 | 1.1 | 0.8 | 0.4 |
| other "off" flavors | 0.4 | 0.2 | 0.4 | — | — | — | — |

[1] Flours were tested as 2% dispersions in charcoal-filtered tap water; Sample C was toasted; Samples A and B were untoasted.
[2] Flavor score of 10 = bland; 9-7 = weak flavor; 6-4 = moderate flavor; 3-1 = strong flavor. Scores with letters in common are not significantly different; 95% confidence level for significant figures.
[3] Intensity values are based on 0-3 rating, with 3 as strong.

We claim:

1. A method for preparing a high-protein, food-grade product from a dry-milled corn germ fraction comprising the steps of:
    a. contacting said dry-milled corn germ fraction with carbon dioxide, under supercritical conditions, as a solvent and thereby extracting the lipids from said germ fraction;
    b. separating the lipid-containing carbon dioxide solvent from the substantially lipid-free germ fraction residue; and
    c. recovering said residue as a high-protein, food-grade product.

2. The method as described in claim 1 wherein said germ fraction comprises at least about 50% germ material.

3. The method as described in claim 1 wherein said dry-milled corn germ fraction is in flaked form.

4. The method as described in claim 1 and further comprising milling said recovered residue into a flour.

5. The product produced by the method of claim 1 wherein said product is characterized by low levels of bound lipid and peroxidase activity.

6. The product produced by the method of claim 2 wherein said product is characterized by low levels of bound lipid and peroxidase activity.

7. The product produced by the method of claim 3 wherein said product is characterized by low levels of bound lipid and peroxidase activity.

8. The product produced by the method of claim 4 wherein said product is characterized by low levels of bound lipid and peroxidase activity.

9. A method for preparing a high-protein, food-grade flour from whole corn comprising the steps of:
    a. grinding said whole corn in the dry state;
    b. separating said ground corn into a starch fraction and a germ fraction;
    c. contacting said germ fraction with carbon dioxide, under supercritical conditions, as a solvent and thereby extracting the lipids from said germ fraction;
    d. separating the lipid-containing carbon dioxide solvent from the substantially lipid-free germ fraction residue; and
    e. recovering said residue as a high-protein, food-grade product.

10. The method as described in claim 9 wherein said germ fraction comprises at least about 50% germ material.

11. The method as described in claim 9 further comprising flaking said dry-milled corn germ fraction prior to extracting.

12. The method as described in claim 9 and further comprising milling said recovered residue into a flour.

13. The product produced by the method of claim 9 wherein said product is characterized by low levels of bound lipid and peroxidase activity.

14. The product produced by the method of claim 10 wherein said product is characterized by low levels of bound lipid and peroxidase activity.

15. The product produced by the method of claim 11 wherein said product is characterized by low levels of bound lipid and peroxidase activity.

16. The product produced by the method of claim 12 wherein said product is characterized by low levels of bound lipid and peroxidase activity.

* * * * *